(12) United States Patent
Campagna

(10) Patent No.: US 10,313,319 B2
(45) Date of Patent: *Jun. 4, 2019

(54) EFFICIENT USE OF KEYSTREAMS

(71) Applicant: Amazon Technologies, Inc., Seattle, WA (US)

(72) Inventor: Matthew John Campagna, Bainbridge Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/945,975

(22) Filed: Apr. 5, 2018

(65) Prior Publication Data
US 2018/0234404 A1    Aug. 16, 2018

Related U.S. Application Data

(63) Continuation of application No. 14/568,071, filed on Dec. 11, 2014, now Pat. No. 9,942,211.

(51) Int. Cl.
| | |
|---|---|
| *H04L 9/32* | (2006.01) |
| *H04L 29/06* | (2006.01) |
| *H04L 9/08* | (2006.01) |
| *H04L 9/06* | (2006.01) |

(52) U.S. Cl.
CPC .......... *H04L 63/062* (2013.01); *H04L 9/0637* (2013.01); *H04L 9/0662* (2013.01); *H04L 9/0822* (2013.01); *H04L 9/0891* (2013.01); *H04L 63/0428* (2013.01); *H04L 63/06* (2013.01); *H04L 63/061* (2013.01); *H04L 63/123* (2013.01); *H04L 2463/061* (2013.01)

(58) Field of Classification Search
USPC ......................................................... 713/171
See application file for complete search history.

(56) References Cited

U.S. PATENT DOCUMENTS

| | | | | |
|---|---|---|---|---|
| 4,864,616 | A * | 9/1989 | Pond ................... | G06F 21/6209 713/165 |
| 5,809,148 | A * | 9/1998 | Doberstein ........... | H04L 9/0637 380/262 |
| 7,076,064 | B2 | 7/2006 | Relander et al. | |
| 7,369,662 | B2 * | 5/2008 | Relander ................... | H04L 9/12 375/240.12 |
| 7,472,285 | B2 * | 12/2008 | Graunke ............. | G06F 12/1408 380/262 |
| 7,636,439 | B2 | 12/2009 | Nakabayashi et al. | |

(Continued)

OTHER PUBLICATIONS

Dworkin, "Recommendation for Block Cipher Modes of Operation: Galois/Counter Mode (GCM) and GMAC," National Institute of Standards and Technology, Special Publication 800-38D, Nov. 2007, 39 pages.

*Primary Examiner* — Amare F Tabor
(74) *Attorney, Agent, or Firm* — Davis Wright Tremaine LLP

(57) ABSTRACT

Performing cryptographic operations such as encryption and decryption may be computationally expensive. In some contexts, initialization vectors and keystreams operable to perform encryption operations are generated and stored in a repository, and later retrieved for use in performing encryption operations. Multiple devices in a distributed system can each generate and store a subset of a larger set of keystreams.

20 Claims, 9 Drawing Sheets

(56) References Cited

U.S. PATENT DOCUMENTS

| | | | |
|---|---|---|---|
| 7,844,831 B2 | 11/2010 | Benhammou et al. | |
| 7,879,111 B2 | 2/2011 | Hardacker et al. | |
| 8,090,098 B2 * | 1/2012 | Kim | H04L 9/0643 380/28 |
| 8,396,209 B2 * | 3/2013 | Schneider | H04L 9/0637 380/28 |
| 8,862,900 B2 * | 10/2014 | Chen | H04L 9/3228 713/190 |
| 9,047,446 B2 * | 6/2015 | Nair | H04L 63/0428 |
| 2002/0066013 A1 | 5/2002 | Relander et al. | |
| 2003/0095663 A1 | 5/2003 | Nelson et al. | |
| 2005/0021986 A1 | 1/2005 | Graunke et al. | |
| 2005/0190920 A1 | 9/2005 | Ahonen | |
| 2006/0023875 A1 * | 2/2006 | Graunke | H04L 9/065 380/28 |
| 2006/0031936 A1 | 2/2006 | Nelson et al. | |
| 2007/0005966 A1 * | 1/2007 | Aissi | H04L 9/0838 713/168 |
| 2008/0044012 A1 | 2/2008 | Ekberg et al. | |
| 2008/0112561 A1 | 5/2008 | Kim et al. | |
| 2009/0013190 A1 * | 1/2009 | Benhammou | G06F 12/1458 713/185 |
| 2012/0144195 A1 | 6/2012 | Nair et al. | |

\* cited by examiner

EFFICIENT USE OF KEYSTREAMS

CROSS-REFERENCE TO RELATED APPLICATION

This application is a continuation of U.S. patent application Ser. No. 14/568,071, filed Dec. 11, 2014, entitled "EFFICIENT USE OF KEYSTREAMS," the disclosure of which is hereby incorporated herein in its entirety.

BACKGROUND

The security of computing resources and associated data is of high importance in many contexts. As an example, organizations often utilize networks of computing devices to provide a robust set of services to their users. Networks often span multiple geographic boundaries and often connect with other networks. An organization, for example, may support its operations using both internal networks of computing resources and computing resources managed by others. Computers of the organization, for instance, may communicate with computers of other organizations to access and/or provide data while using services of another organization. In many instances, organizations configure and operate remote networks using hardware managed by other organizations, thereby reducing infrastructure costs and achieving other advantages. With such configurations of computing resources, ensuring that access to the resources and the data they hold is secure can be challenging, especially as the size and complexity of such configurations grow.

Encryption, for example, is used extensively for the purpose of preventing unauthorized access to data. Generally, a cryptographic key is used to reversibly transform data to a state where information is both computationally and humanly unascertainable without access to the cryptographic key or without extraordinary measures (e.g., a cryptographic attack). Many encryption algorithms rely on the use of an initialization vector (IV) for encryption, decryption, and other cryptographic operations. An initialization vector is an arbitrary number that may be used for encryption only once with a particular cryptographic key. The initialization vector may be random/pseudorandom or may be stateful. In some systems, there may be greater risk of security threats as a cryptography key is repeated used to perform cryptographic operations, exhausting more and more of the available initialization vectors. In some systems, it may be desirable to rotate the use of cryptographic keys by decrypting data encrypted under a cryptographic key and encrypting the data under a second cryptographic key. However, the process of decrypting and encrypting data may be computationally expensive and present resource and/or performance constraints on some systems, especially in scalable systems.

BRIEF DESCRIPTION OF THE DRAWINGS

Various embodiments in accordance with the present disclosure will be described with reference to the drawings, in which.

DETAILED DESCRIPTION

Figure 1:
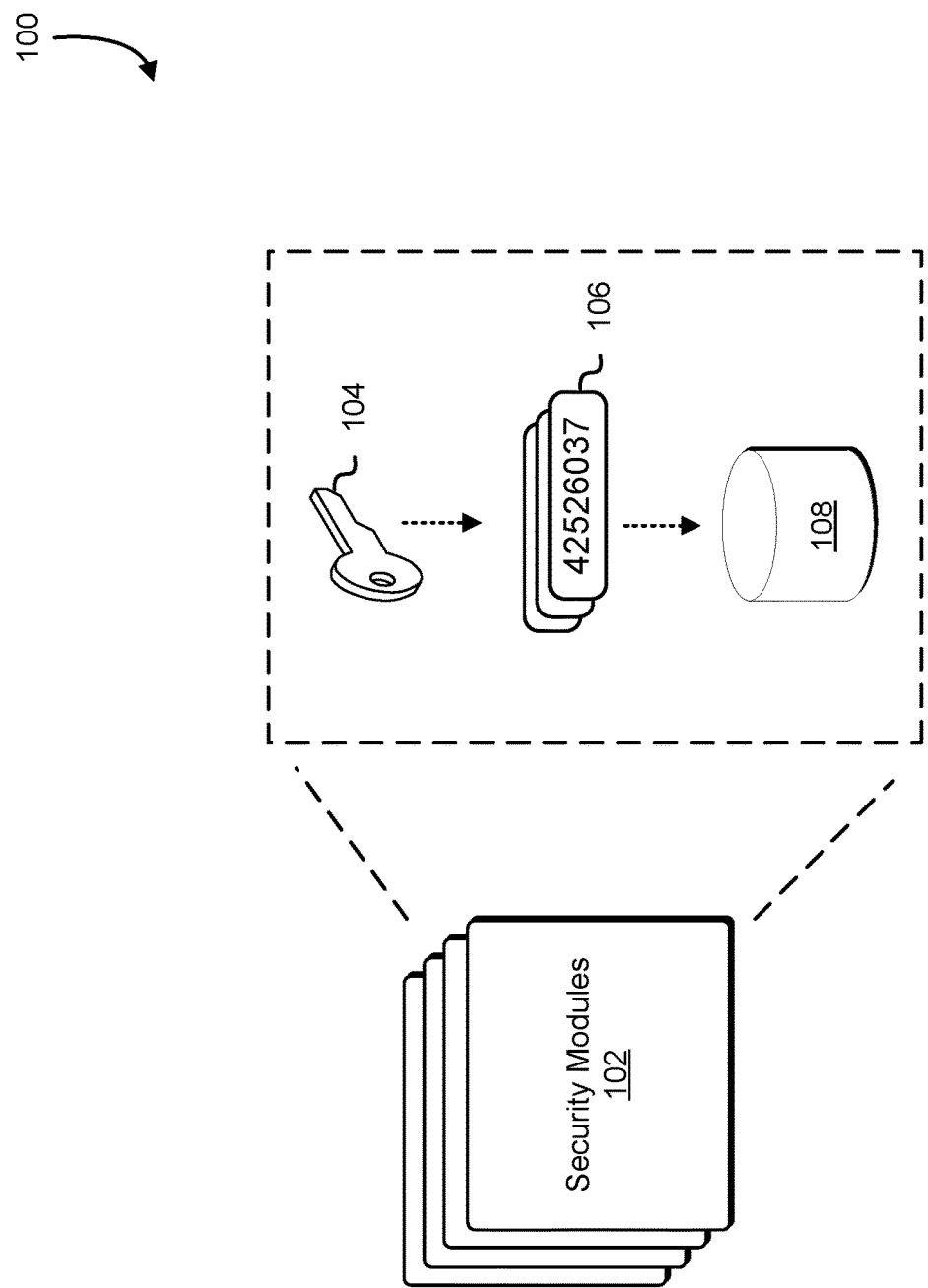
FIG. 1 illustrates an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein provide for improved operation of computer systems that perform or otherwise rotate cryptographic keys. Rotation of cryptographic keys refers to obtaining data encrypted under a first cryptographic key, decrypting the data, and encrypting it under a second cryptographic key. In an embodiment, a cryptography service (e.g., a system, which may be a distributed system, configured to perform cryptographic operations) generates a set of initialization vectors and keystreams that may be used later to perform a key rotation. In an embodiment, a security module coordinator orchestrates the pre-generation of initialization vectors and keystreams among a plurality of security modules, which may be hardware security modules. Generally, a security module is a device that provides hardware-based protection of cryptographic material (e.g., cryptographic keys) such that the cryptographic materials is programmatically unexportable from the device.

Information may be said to be programmatically unexportable if there is no legitimate way to programmatically cause (e.g., through an interface of the device) the device to provide the information). The information may be maintained, for example, such that there is no request mechanism (e.g., application programming interface (API) call) for causing hardware, with access to the information in plaintext form, to reveal the information in plaintext form. As an example, a device storing the information (e.g., cryptographic module) may be configured to lack an ability to provide a copy of some or all of its memory such that the copy includes the information in plaintext form. It should be noted however, that while information for which there is no legitimate way of obtaining the information in plaintext form is used throughout the disclosure for the purpose of illustration, some information may be maintained such that the information is obtainable through a limited number of authorized uses, which may require various security protocols to be employed and able to prevent unauthorized access to the information in plaintext form. Generally, programmatically unexportable information is information (e.g., one or more cryptographic keys) for which extraordinary measures must be taken to obtain the information in plaintext form, if it is possible at all to obtain the information in plaintext form. Example security modules include hardware security modules (HSMs) and trusted platform modules (TPMs). Note, however, that the techniques described herein can be used with other devices that do not necessarily provide hardware-based protection of cryptographic material.

In some embodiments, a set of security modules each has access to the same cryptographic key, called a "domain key." The security modules may, among other uses, use the domain key to encrypt data so that the data can be persisted outside of a security module and/or so that data can pass securely from one security module to the other, with the other being able to decrypt the data. A set of data objects, such as cryptographic keys managed on behalf of users (e.g., customers of a computing resource service provider that operates the cryptography service) of the cryptography service may be encrypted under a domain key and persisted outside of the security modules such that a data object of the set can be provided to a security module and the security module can decrypt it (e.g., in response to a decryption request). As a result, rotation of a domain key may involve reencryption of the set of data objects from the current domain key to the next domain key. The set of data objects may be large and, as a result, rotation may involve distributed effort by security modules.

For this rotation, in an embodiment, the security module coordinator orchestrates the security modules in preparing for the rotation by having each security module generate a set of initialization vectors and corresponding keystreams. The initialization vectors and corresponding keystreams (a pair of which also described herein as an IV-keystream pair) are persisted (i.e., persistently stored) in non-volatile storage, for example, in a database or data file. In an embodiment, the IV-keystream pair is stored as a record within a database table (also described herein as an IV-keystream repository) and can be retrieved or deleted; the database is further used to store a plurality of IV-keystream pairs. In some embodiments, the initialization vector and corresponding are disaggregated (e.g., not stored in logically and/or physically separation) such as: by persisting initialization vectors in a first database table and keystreams in a second database table and associating them using a foreign key; or by storing the initialization vectors in a first data file and keystreams in a second data file. If persisted outside of a security module, sets of IV-keystream pairs may be stored in encrypted form, e.g., encrypted under the current or next domain key.

In some embodiments, the security module obtains a set of customer keys from a storage device (e.g., a SAN or network drive or other data storage service) to be rotated, wherein the customer keys are encrypted under the current domain key. In some embodiments, each customer key in the set of customer keys will be rotated, where rotation entails the decryption of the customer key using the current domain key and the initialization vector used to encrypt the customer key, and an encryption of the unencrypted customer key using, at least a keystream from the IV-keystream repository. Because the keysteam has been pregenerated, the security module can perform the encryption more efficiently at the time the rotation occurs, where other processing involved in the rotation is performed at other times, e.g., when load on the cryptography service is lighter.

FIG. 1 shows an illustrative example of a diagram 100 illustrating various aspects of the present disclosure. In an embodiment, one or more security modules 102 are configured to use a domain key 104 to generate a set of keystreams 106 which may be stored in a repository 108. As discussed in more detail below, the repository may be implemented in various ways in various embodiments. In some embodiments, each security module has its own internal data storage device that serves to implement the repository 108. In such embodiments, keystreams stored by a security module 102 may be persisted in plaintext form (e.g., because a security module provides hardware-based protection of data stored inside). In other embodiments, the repository is implemented outside of a security modules 102 and, in such embodiments, keystreams may be stored in encrypted form (e.g., encrypted under the current or the next domain key). Each security module may have its own repository. In yet other embodiments, multiple security modules share the same repository. Note that, in embodiments where the repository 108 is external to the security modules 102, security modules may use batching so improve computational efficiency. A security module may, for instance, import an encrypted data object that it can decrypt to obtain multiple keystreams.

In some embodiments, keystreams are used to facilitate the rotation domain keys such that the domain key to be retired (not shown in FIG. 1) will be replaced by the domain key 104. In some embodiments, as part of the process of rotating domain keys, customer keys are reencrypted such that customer keys that were encrypted using the domain key to be retired (not shown in FIG. 1) will be decrypted and the plaintext customer key encrypted using the domain key 104. However, performing cryptographic operations such as decryption and encryption may be computationally expensive and may, in some cases, degrade performance of the overall system or make a customer key unavailable for a prolonged duration. In some embodiments, the process of reencrypting customer keys is expedited by performing a subset of the reencryption process before the customer key is obtained and reencrypted. FIG. 1 shows an illustrative example where initialization vectors and keystreams usable to perform encryption operations may be generated and stored, such that when a request to encrypt a customer key under domain key 104 is issued, the computational cost of generating initialization vectors and keystreams can be avoided by retrieving a keystream and initialization vector that has been generated and stored in an IV-keystream repository 108.

In an embodiment, the domain key 104 is usable to perform cryptographic operations on data (e.g., customer keys). In examples in accordance with FIG. 1, the domain key 104 may be a new domain key that has not yet been used to encrypt customer keys. The security module 102 may, in some embodiments, have another domain key (not show in FIG. 1) which has been used to encrypt customer keys. The domain key 104 may be distributed across the set of security modules 102 such that each security module in the set of security modules has access to the domain key 104.

In some embodiments, the domain key is usable in the creation of keystreams. Keystreams are data that is used in conjunction with a cryptographic algorithm to perform an encryption and/or decryption operation. Examples of cryptographic algorithms that use keystreams to perform encryption are Advanced Encryption Standard Galois/Counter Mode (AES-GCM) or Advanced Encryption Standard Counter with CBC-MAC (AES-CCM). In some embodiments, keystreams are created using a keystream generator that creates output keystreams based on inputs that may include a cryptographic key and an initialization vector. A keystream generator may be a processor configured to generate keystreams, either by being hard-coded with circuitry for generating such keystreams or by being configured with software instructions for generating keystreams. It should be noted that in many cryptographic algorithms, that using an initialization vector more than once to generate a keystream may be unsafe and cause assurance of security to no longer be valid. As such, some embodiments may ensure that the initialization vector is non-repeating, both within a single security module and among multiple security modules in the same cryptographic domain (e.g., authorized to have the same domain key). Various mechanisms may be used to ensure that the initialization vector is non-repeating. In some embodiments, the initialization vector may be generated by using a unique identifier associated with the security module generating the initialization vector.

In some embodiments, the initialization vector, which may be obtained using any suitable mechanism (e.g., as described above) may be used to generated a keystream. A keystream may be a random or pseudo-random number that may be used to encrypt a plaintext message. In an embodiment, a keystream is generated using a counter mode of operation such as AES-GCM or AES-CCM that accepts as inputs a cryptographic key (e.g., domain key) and an initialization vector and generates as an output a random or pseudo-random number.

Once the keystream has been generated, it may be persisted in an IV-keystream repository 108. The IV-keystream repository may be persisted in any suitable storage medium (e.g., volatile and non-volatile storage media). For example, the IV-keystream repository may store the initialization vectors and the corresponding keystreams generated by those initialization vectors in a database wherein the keystream and initialization vectors are stored in a record or in associated records (e.g., using a foreign-key relationship). In other embodiments, the initialization vector and keystream are stored such that they are physically and/or logically isolated from each other. For example, keystreams and initialization vectors may be physically isolated from each other in an environment where the keystreams and initialization vectors are stored on a distributed system wherein the data for keystreams is in one geographical location (e.g., a first data center) and the data for the initialization vectors is in a second geographical location (e.g., a second data center remote from the first). As a second example, keystreams and initialization vectors may be logically isolated from each other in an environment where keystreams are stored in a first data file and initialization vectors are stored in a second data file and the association between the initialization vectors and keystreams stored in a third data file. Access to the data files in the example just described above may be managed by a coordinator.

In some embodiments, encryption of plaintext data (e.g., a plaintext customer key) is performed by using the plaintext data and the keystream as inputs. For example, in counter mode encryption, the ciphertext data is generated by performing a bitwise XOR operation between the plaintext data and a keystream. In addition, cipher mode decryption may be performed by performing a bitwise XOR operation between the ciphertext data (e.g., ciphertext customer key) and the same keystream value used in the cipher mode encryption. That keystream value may be securely persisted from the cipher mode encryption or may be generated by using the domain key and same initialization vector used in the cipher mode encryption.

Figure 2:
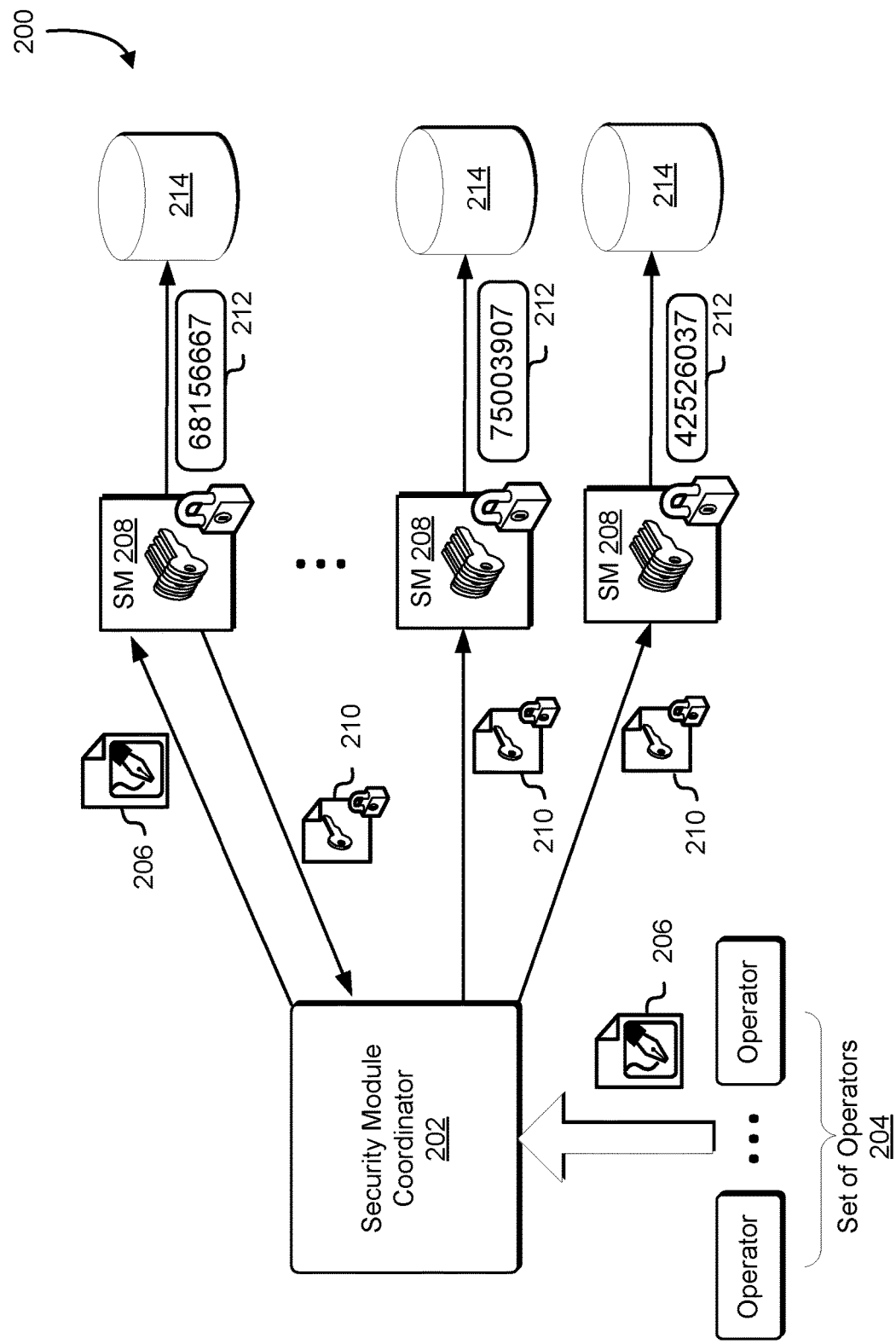
FIG. 2 illustrates an environment in which various embodiments can be implemented.

FIG. 2 shows an illustrative example of a diagram 200 illustrating various aspects of the present disclosure. FIG. 2 shows an environment configured to distribute a domain key 210 to a set of security modules 208 which may be used to generate keystreams 212 that may be stored in an IV-keystream repository 214 for later use in encryption.

Turning to the specific components of FIG. 2, in an embodiment, the security module 202 is configured to receive a quorum-authorized command 206 from a set of operators devices (referred to simply as "operators") 204. The set of operators may be devices operated by human or other administrators authorized to cause the devices to operate as operators. For example, the ability of a device to operate as an operator may require authorization from a human user who may provide credentials that prove authorization. The operators may be responsible for administrative maintenance of the distributed system, such as making updates and other changes to the system. In various embodiments, as discussed in more detail below, many actions performable by the operators require compliance with a set of quorum rules.

Quorum rules may specify conditions on a set of operators being authorized to issue a command. For example, the conditions may specify a minimum number of operators required to issue a command to a security module to create a domain. The minimum number may be specified explicitly (e.g., an explicit number of operators required) or implicitly (e.g., by specifying a percentage of authorized operators required). Conditions may also be more complex. For instance, operators may also have roles which may be associated with the operators (i.e., with identifiers of the operators). Conditions of the quorum rules may specify conditions on roles, such as a minimum number of operators having a particular role being required. Conditions may also be structured such that there may be different ways of satisfying the quorum rules. As an illustrative example, quorum rules may be satisfied if a first number of operators having a first role authorize a command to create a domain or if a second number of operators having a second role authorize the command. Individual conditions may be combined with Boolean operators, such as AND, OR, NOT and any combination thereof. Other information may also be associated with individual operators and quorum rules may have conditions based at least in part on that other information.

In some embodiments, a quorum-authorized command is issued based on the authorization from a quorum of operators in the domain. There may be quorum rules (not shown in FIG. 2) that define the conditions for satisfying a correctly authorized command. For example, in some embodiments, a quorum may consist of obtaining an authorization from a simple majority (i.e., greater than half) of the operators in the set of operators. A second example of a quorum rule may be requiring that all operators in the set of operators authorize the command to reach a quorum. In some embodiments, a quorum-authorized command includes digital signatures from operators to cryptographically prove that a quorum of operators has authorized the command. Digital signatures may be used to verify the authenticity of a message (e.g., a quorum-authorized command) using various algorithms including but not limited to RSA-based signature schemes.

In an embodiment, the security module coordinator 202 obtains a quorum-authorized command 206 from the set of operators 204 wherein the quorum-authorized command 206 authorizes the creation of a domain key. In an embodiment, the security module coordinator 202 is a component that is operable to receive quorum-authorized command and communicate (i.e., make requests and receive responses) from a set of security modules 208 in a domain. The security module coordinator 202 may be implemented as hardware, software, or a combination thereof. In some embodiments, a domain may contain a set of security module coordinators however, for clarity, only a single security module coordinator is shown in FIG. 2. In some embodiments, the security module coordinator 202 may be a computing resource located within a cryptography service (also referred to as a key management service). A cryptography service may be a collection of computing resources configured to manage and use cryptographic keys for customers of a computing resource service. In an embodiment, the security module coordinator 202 is configured to issue a request to the set of operators 204 for a quorum-authorized command 206 for generating a domain key. The set of operators may, upon receiving the request, check that the set of quorum rules are satisfied, generate a quorum-authorized command 206, and make the quorum-authorized command 206 available to the security module coordinator 202. In some embodiments, the set of operators makes available to the security module coordinator 202 a quorum-authorized command 206 based at least in part on a trigger, wherein the trigger may be a request (as described above), but may also be based on a schedule (e.g., a quorum-authorized command is made available to the security module coordinator on a periodic basis), available computing resources (e.g., a quorum-authorized command is made available based on available or anticipated availability of computing resources within the domain), or other similar mechanism.

The security module coordinator 202 may further be configured to communicate with a set of security modules 208 within the domain. In some embodiments, the communication between the security module coordinators and security modules includes the security module coordinator being operable to issue requests (e.g., API calls) to the set of security modules and receive responses from the set of security modules. In some embodiments, the security module coordinator may communicate with a specific security module, a plurality of security modules, or all of the security modules.

The security module coordinator 202 may be configured to use a quorum-authorized command 206 to obtain a domain key from a security module 210. In an embodiment, the security module coordinator issues a command to a security module (the security module may, as described above, be selected using a variety of methods) wherein the command includes instructions to generate a domain key and further include a quorum-authorized command. The security module, upon receiving the command, may authenticate the command. In an embodiment, the security module determines whether the request is authentic by obtaining the quorum-authorized command from the request, obtaining the quorum rules, and determine whether quorum-authorized command received satisfies the quorum rules. In some embodiments, this determination may be necessary because the security modules may be operable to communicate with several entities in addition to the security module coordinator 202. In some embodiments, the determination may be necessary because the security module coordinator 202 or communication channel with the security module may be insecure or may have been tampered with (e.g., a malicious computer virus).

In some embodiments, the security module, upon determining that command is authorized, the security module generates a new domain key. The new domain key may then be encrypted under a second domain key (not shown in FIG. 2) and the encrypted new domain key 210 is made available to the security module coordinator 202. It should be noted that the new domain key may be encrypted (e.g., under a previous domain key) before being made available to the security module coordinator based on security precautions or constraints, as there may be no assurances of secure transmission of a plaintext domain key outside of the security module. In an embodiment, the second domain key is accessible by the set of security modules 208 (e.g., each security module may have its own local copy of the second domain key, may have access to a global copy of the second domain key stored elsewhere, etc.). In some embodiments, the second domain key is a domain key that will be rotated out of use and replaced by the newly generated domain key. In some embodiments, the encrypted domain key is made available to the security module coordinator directly as part of the payload of an API call response. In other embodiments, information usable to obtain the encrypted domain key is provided—for example, the security module may, upon creating and encrypting a new domain key, store the encrypted domain key on a network storage device (e.g., a shared network drive, NAS, etc.) and make available a URL or drive path to the security module coordinator.

The set of security modules 208 may, in some embodiments, be utilized to security store sensitive cryptographic information (e.g., domain keys, keystreams, etc.) and may further be configured to receive requests to perform commands and provide responses. In an embodiment, each security module in the set of security modules 208 is configured to receive an encrypted domain key 210, decrypt the encrypted domain key 210, and generate keystreams 212. In some embodiments, each security module is further configured to access an IV-keystream repository, including the capability to read and write data into the IV-keystream repository. In some embodiments, each security module is configured to generate new domain keys, encrypt domain keys, and make domain keys available.

In some embodiments, each security module is configured to rotate domain keys. In some embodiments, rotating a domain key includes obtaining a new domain key (e.g., an encrypted domain key 206 distributed by the security module coordinator 202), obtaining a set of customer keys encrypted under a second domain key, and reencrypting the customer keys under the new domain key. In some embodiments, the rotation of domain keys may use the IV-keystream repositories 214 to efficiently perform the domain key rotation.

In some embodiments, the security module coordinator 202 is configured to provide a command to each security module in the set of security modules 208 to perform a domain key rotation. In some embodiments, the security module coordinator 202 provides an encrypted domain key 210 to each of the security module in the set of security modules 208. However, in some embodiments, the security module coordinator will provide the command only to a subset of the set of security modules—for example, in FIG. 2, the security module coordinator does not send a command to the security module that was instructed to generate the new domain key. In some embodiments, the security module is distributed within the set of security modules 208. For example, in an embodiment, a security module, upon generation of a new domain key, distributes the domain key to the set of domain keys either directly (e.g., by making available the new domain key to all security modules), indirectly (e.g., by making available the new domain key to a second security module, and in turn the second security module makes available the new domain key to a third security module, etc.), or any combination thereof.

In some embodiments, each security module in the set of security modules 208 is operable to generate keystreams 212. In some embodiments, security modules generate keystreams based on a trigger or set of triggers. Triggers may take many forms, and may include time-based triggers (e.g., triggers that are activated at a periodic interval), event-based triggers (e.g., triggers that are activated based on the detection of an event, such as the receiving of an authorized command to rotate keys), resource-based triggers (e.g., triggers that are activated when computing resources are idle), condition-based triggers (e.g., triggers that are activated if the domain key uses a specific encryption algorithm), or any combination thereof. In some embodiments, triggers (and the activation of the triggers) may be managed by the security module coordinator, but the management of triggers may also be performed by other components (e.g., by the security modules themselves or by a task management coordinator (not shown in FIG. 2)).

In an embodiment, each security module in the set of security modules 208 has access to an IV-keystream repository 214 operable to create, read, update, and delete keystream values and may be implemented as software, hardware, or some combination thereof. The IV-keystream repository may, in some embodiments, be implemented using one or more non-volatile storage components (e.g., database tables, data files), volatile storage components (e.g., memory-based data structures, hardware/software caches), or any combination thereof. In some embodiments, the IV-keystream repository is implemented as a component within the security module to ensure that the IV-keystream repository is secure and to prevent tampering of the IV-keystream repository by unauthorized components and/or parties. In some embodiments, the initialization vectors used to generate the corresponding keystreams is not stored in the IV-keystream repository but rather, is computable based on the IV-keystream repository. For example, in embodiments where the initialization vector uses a counter, the first keystream may correspond to a counter value of 1, the second keystream a counter value of 2, and so on. In some embodiments, the initialization vector and keystream is stored as a logical pair (e.g., stored in a database record as rows) or is stored logically separate from each other with additional associative metadata (e.g., stored in separate data files with association data in a third data file).

Figure 3:
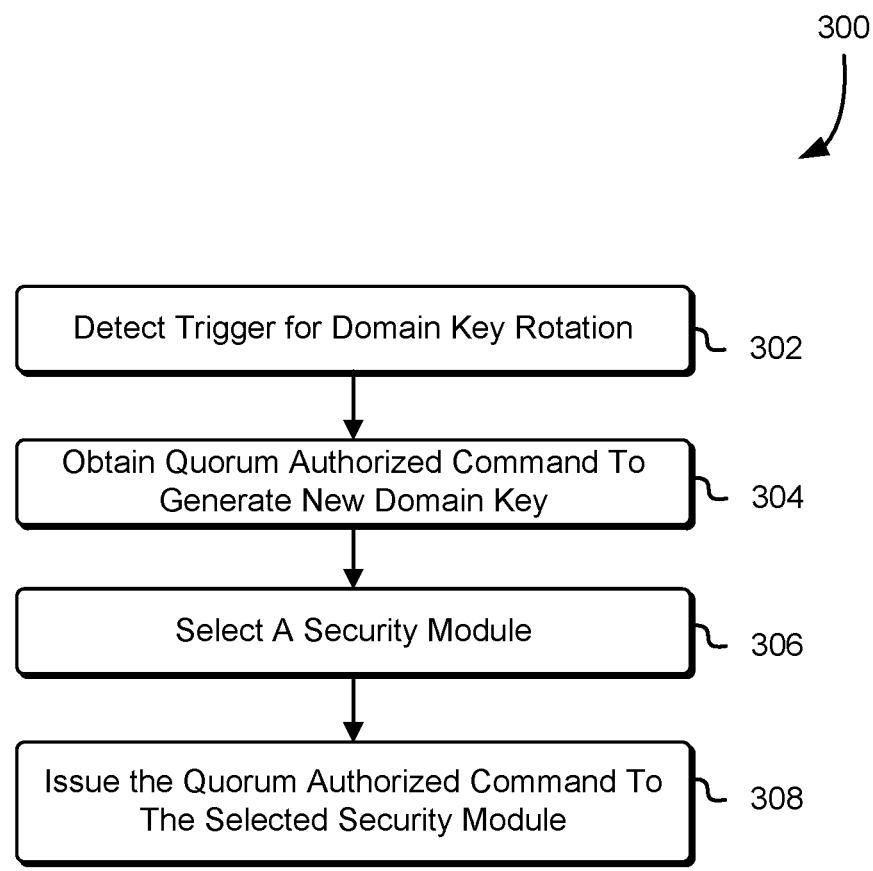
FIG. 3 is an illustrative process for generating a domain key.

FIG. 3 describes an illustrative process 300 for performing a domain key rotation. The process 300 may be performed, for example, by a security module coordinator as described in FIG. 2. In an embodiment, the security module coordinator may detect 302 a trigger for domain key rotation. In some embodiments, a security module coordinator 202 performs key rotations based on a trigger or multiple triggers. In some embodiments, triggers include time-based triggers (e.g., rotations are performed on a periodic interval), event-based triggers (e.g., rotations are performed based on the detection of an event, such as the receiving of an authorized command to rotate keys), resource-based triggers (e.g., rotations are performed when computing resources are idle) condition-based triggers (e.g., rotations are performed if the domain key uses a specific encryption algorithm), or any combination thereof. In some embodiments, the rotation of the domain keys is performed as a background task wherein a subset of the operations performed as part of a key rotation may be pre-empted by other operations. For example, in a multi-tenant environment, a client-issued request to use a customer key (e.g., in performing cryptographic operations) may have higher priority than a background task to reencrypt the same customer key under a new domain key. In some embodiments, a task manager is used to prioritize and service various requests in relation to context of the requests that may include the caller's identity, the type of task being requested, shared resources that may be needed to fulfill the request, additional metadata included in the request (e.g., an explicit priority setting), and any combination thereof.

Upon detecting the trigger condition, in an embodiment, the security module coordinator obtains 304 a quorum-authorized command to generate a new domain key. The obtaining may be done using various mechanisms. For example, in an embodiment, a security module coordinator 202 may make an API call requesting a quorum-authorized command from a set of operators 204.

The security module coordinator may select 306 a security module. In selecting the security module, the selection may be done based on static identifiers (e.g., the use of a globally or locally unique identifier to select a set of security modules within the domain) or dynamically (e.g., by selecting a set of security modules based on available computing resources or anticipated availability of computing resources within the domain). In some embodiments, security modules is selected at random. Note, however, that the security modules from which the security modules is selected may be limited to security modules in a cryptographic domain for which the domain key is being rotated. The security module coordinator may, for instance, exclude from selection security modules lacking access to the current domain key.

In an embodiment, after obtaining 304 a quorum-authorized command and selecting 306 a security module, the security module coordinator issues the quorum-authorized command to the selected security module 308 instructing the security module to generate a domain key. The command may be issued using a variety of mechanisms including but not limited to using an API call to issue the command.

Figure 4:
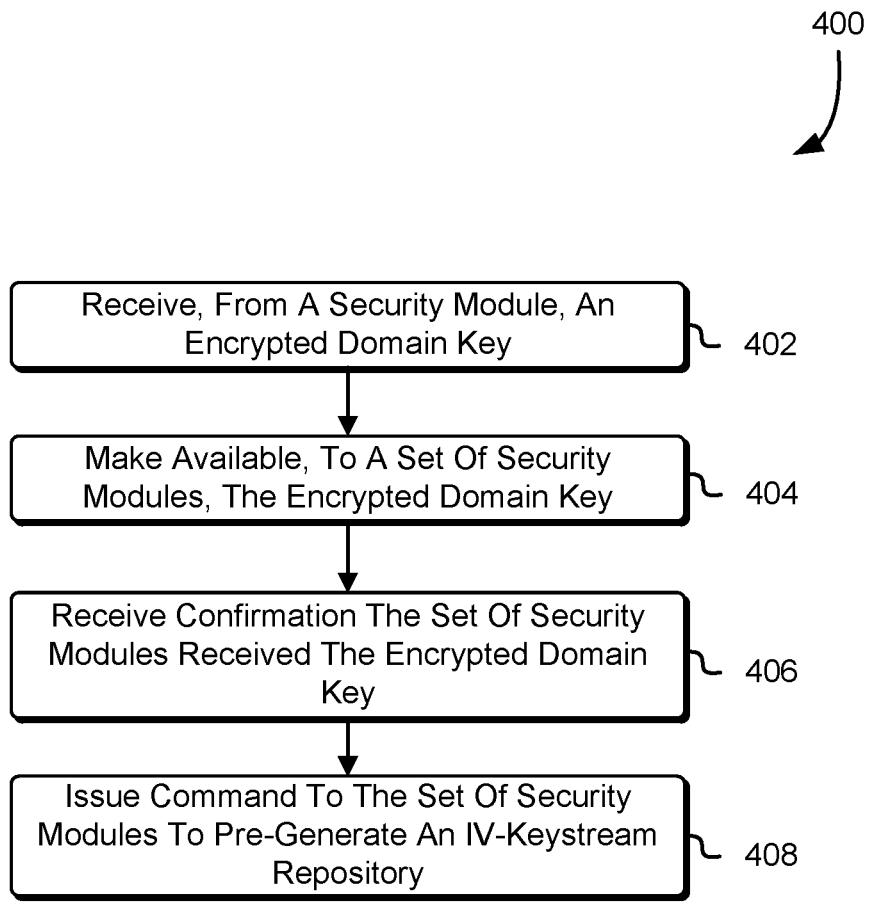
FIG. 4 is an illustrative process for distributing a domain key.

FIG. 4 describes an illustrative process 400 for distributing a new domain key to a set of security modules and issuing a command to the set of security modules to generate a keystream repository. The process 400 may, in some embodiments, be performed at least in part by a security module coordinator as described in FIG. 2.

In some embodiments, the security module coordinator receives 402 from a security module an encrypted domain key—the receiving may be done directly (e.g., the security module directly sends in a request or response the encrypted domain key) or may be done indirectly (e.g., the security module coordinator receives instructions for retrieving the encrypted domain key and must perform additional operations to obtain the encrypted domain key). In some embodiments, the encrypted domain key may be received in response to a request made by the security module coordinator to create a new domain key. Further, in some embodiments, the request by the security module to create a new domain key may be a quorum-authorized command to create a new domain key.

In some embodiments, the security module coordinator, upon receiving the encrypted domain key, makes available 404 to a set of security modules the encrypted domain key. In some embodiments, the security module coordinator makes the encrypted domain key available to the set of security modules by sending the encrypted domain key to each security module of a set of security modules. In some embodiments, each security module will provide an acknowledgement that the security module has received the encrypted domain key, and thus, the security module coordinator can determine whether all security modules have received and acknowledged receipt of the encrypted domain key. In some embodiments, the security module coordinator re-sends, upon detecting that a security module has not acknowledged receipt of the encrypted data, the encrypted data key. This process of re-sending the encrypted data key may be repeated based on the number of security modules that do not acknowledge receipt of the encrypted data key within acceptable parameters (e.g., response is not received within a timeout period) and may be repeated multiple times for the same security module. In some embodiments, the security module coordinator receives, after making available 404 to a set of security modules the encrypted domain key, confirmation 406 the set of security modules received the encrypted domain key. The confirmation may be received at a later point in time (represented by the dashed line between 404 and 406), for example, through acknowledgements received from each of the security modules in the set of security modules. In other embodiments, the confirmation is received by the security module coordinator polling the state of security modules by issuing an additional request asking the security module coordinator whether it has received the encrypted domain key.

A command may be issued 408 to the set of security modules to generate a keystream repository. In some embodiments, the command is issued independently from receiving 406 confirmation the set of security modules received the encrypted domain key—for example, the command may be issued 408 prior to the set of security modules receiving the encrypted domain key and may be queued or delayed until the encrypted domain key is received.

In some embodiments, the command issued is a quorum-authorized command that is signed and authorized by a quorum of operators such as those described in accordance with FIG. 2.

Figure 5:
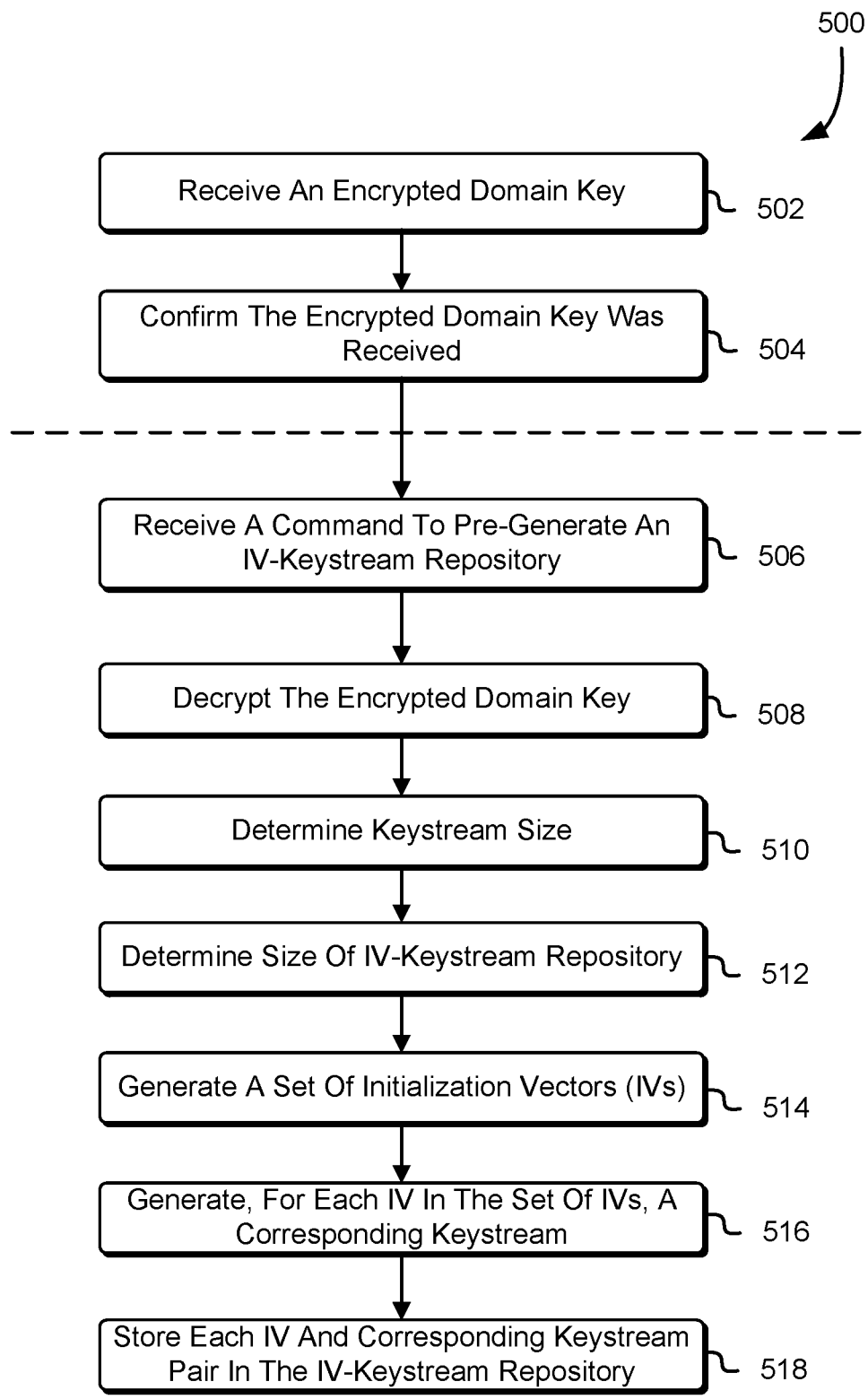
FIG. 5 is an illustrative process for generating an IV-keystream repository.

FIG. 5 describes an illustrative process 500 for generating a keystream repository. The process 500 may be performed by a security module described above in FIG. 2 or any other suitable component or components. In some embodiments, the security module receives 502 an encrypted domain key from a security module coordinator as part of the distribution of domain keys as described in FIG. 4. In some embodiments, the security module receives 502 an encrypted domain key from a security module coordinator—the receiving may be done directly (e.g., the security module receives as part of a request or command the encrypted domain key) or may be done indirectly (e.g., the security module receives instructions for retrieving the encrypted domain key and must perform additional operations to obtain the encrypted domain key). In some embodiments, the encrypted domain key is received from a second security module. Further, in some embodiments, the request by the security module to create a new domain key is a quorum-authorized command to create a new domain key.

In some embodiments, the security module confirms 504 the encrypted domain key was received by sending an acknowledgement that the encrypted domain key was received. It should be noted that in some embodiments, the encrypted domain key is received from a first component and the acknowledgement sent to a second component—for example, in an embodiment, the security modules distributes the encrypted domain keys internally (e.g., the encrypted domain key is distributed directly between security modules) and dispatch acknowledgements to the security module coordinator upon the receiving of the encrypted domain key.

At a later point in time (represented by the dashed lines between 504 and 506) a command may be received 506 to generate a keystream repository. In some embodiments, the security module receives a quorum-authorized command to generate a keystream repository. In some embodiments, the command may include additional information usable in the generation of the keystream repository. For example, the command may include a size of the keystream repository or other information usable in the generation of the keystream repository.

The encrypted domain key is decrypted 508 using a cryptographic key. In some embodiments, the current domain key—that is, the domain key used by the security modules to perform cryptographic operations on customer keys—is used to decrypt the encrypted domain key. In some embodiments, the cryptographic key used to decrypt the encrypted domain key is managed directly by the security module performing the decryption (e.g., the current domain key).

In some embodiments, the determining 510 of the keystream size is performed by the security module. In some embodiments, the keystream size is estimated by obtaining from the keystream repository the size of the keystream used in a previous encryption of a customer key. In some embodiments, the size of the keystream may be determined by obtaining a customer key and determining the length of the keystream needed to encrypt the customer key.

In some embodiments, the determining 512 of the size of the keystream repository is performed by estimating the number of keystreams to generate and to estimate the size of each keystream by using the methods described above in 510. The number of keystreams to generate may be estimated by obtaining from the keystream repository the number of keystreams used previously in encrypting customer keys. The number of keystreams to generate may also be estimated by obtaining the number of customer keys, although there may be additional performance constraints in the obtaining of the customer keys.

In some embodiments, the security module will generate 514 a set of initialization vectors. Initialization vectors may be random/pseudorandom or may be stateful. In some embodiments, initialization vectors are generated using a unique identifier (or other information specific to the security module) concatenated with a counter to ensure that initialization vector values are not re-used. For example, an initialization vector composed of 192-bits may fill the top 128-bits of the initialization vector with a unique identifier of the security module (e.g., a globally unique identifier (GUID), machine access control address, etc.) and concatenate it with a 64-bit counter in the lower 64 bits. For the purposes of generating initialization vectors, the identifiers need only be in unique insofar as each security module identifier is not used by another security module within the set of security modules generating initialization vectors. In such an example, to preserve the size and alignment of the initialization vector, the fields composing the initialization vector may be padded so that they completely fill the bit-space that they are assigned.

Continuing with the example above, several initialization vectors are provided below for illustration:

[192-bit initialization vector]
[128-bit security module GUID]   [64-bit counter]

Security Module 1 (SM1) hexadecimal GUID=122c87f9-a799-48d1-8d30-27caf6150c02 First initialization vector created by SM 1 (1 padded to 32 bits):

122c87f9a79948d18d3027caf6150c020000000000000001
122c87f9a79948d18d3027caf6150c02    0000000000000001

By extension, the one-hundred-eleventh (111 base 10=6f base 16) initialization vector created by SM1:

```
122c87f9a79948d18d3027caf6150c02000000000000006f
122c87f9a79948d18d3027caf6150c02    000000000000006f
```

First initialization vector created by SM2 (GUID=dada64bf-775b-47fe-9ab2-4d4ba4589a1e):

```
dada64bf775b47fe9ab24d4ba4589a1e 0000000000000001
dada64bf775b47fe9ab24d4ba4589a1e    0000000000000001
```

As shown above, the initialization vectors generated by one security module will necessarily be unique (i.e., distinct) from initialization vectors generated by another security module at least because the security modules have different unique identifiers. Furthermore, initialization vectors generated within a security module will be distinct from each other based on the counter for the first 2^64 initialization vectors generated. In some embodiments, the security module is configured to stop generating initialization vectors past this limit, or to generate an error stating that the initialization vector could not successfully be created. In some embodiments, the unique identifier used is locally unique but not globally unique—for example, a locally unique identifier may simply assign an indexed number to each security module (e.g., SM1=1, SM2=2).

It should be noted that in other embodiments, the initialization vector is generated using other suitable methods that ensure that an initialization vector is not used more than once. For example, in some embodiments the initialization vector may be generated by reserving a portion of possible initialization vector values to each security module. In an example, the initialization vector values may be reserved to security modules based on a simple algorithm assigning the first 10,000 initialization vector values (1-10,000) to a first security module, the second 10,000 initialization vector values (10,001-20,000) to a second security module, and so on. Generally, techniques of the present disclosure include any suitable method for causing each device of a plurality of devices to generate and store a different subset of a set of keystreams, where the subset lacks any keystream that was generated by another device of the plurality of devices (for reencryption of a set of data objects).

In some embodiments, the same initialization vector may be used more than once and the same keystream value may be generated and stored more than once (e.g., the same IV-keystream pair may be duplicated across multiple security modules). In such embodiments, a synchronization mechanism may be used to coordinate the security modules such that the same initialization vector and keystream are not used more than once. For example, multiple security modules may generate the same set of IV-keystream pairs and a security module coordinator may issue instructions to rotate customer keys where the instructions indicate which pairs to use, thereby enabling the security module coordinator to ensure that the same IV-keystream pair is not used more than once to reencrypt different customer keys. As another example, security modules may report which IV-keystream pairs the security modules use and a central entity (e.g., security module coordinator) may monitor use of the same IV-keystream pair for different customer keys. As yet another example, a set of security modules may implement a consensus protocol and use communications among themselves to ensure that the same IV-keystream pair is not used more than once for different customer keys. Other variations are also considered as being within the scope of the present disclosure.

In an embodiment, initialization vectors (such as those generated using the method described in 514) are used to generate 516 corresponding keystreams. In an embodiment, each initialization vector and the domain key are used as inputs to a keystream generator and generates a keystream, wherein the keystream is a stream of random or pseudorandom numbers or characters. Furthermore, the keystream generator may deterministically generate the keystream given the same initialization vector and domain key. Keystreams are useable in conjunction with a plaintext to generate a ciphertext. For example, in some embodiments, a bitwise XOR of a keystream with a plaintext generates a ciphertext. In some embodiments, the keystream is generated using the GCTR function defined in the NIST SP800-38D publication, which is incorporated herein by reference.

Keystreams—for example, those generated as described in 516—may be stored 518 in a keystream repository. In some embodiments, the initialization vector used to generate a keystream is also stored and may also be associated with the keystream. The keystream repository may, in some embodiments, be implemented in accordance with the keystream repository described in FIG. 2. The keystreams may be stored in the keystream repository using any suitable methods, including API calls, direct access (e.g., directly opening a data file and writing a new keystream entry into the data file), and other such methods.

Figure 6:
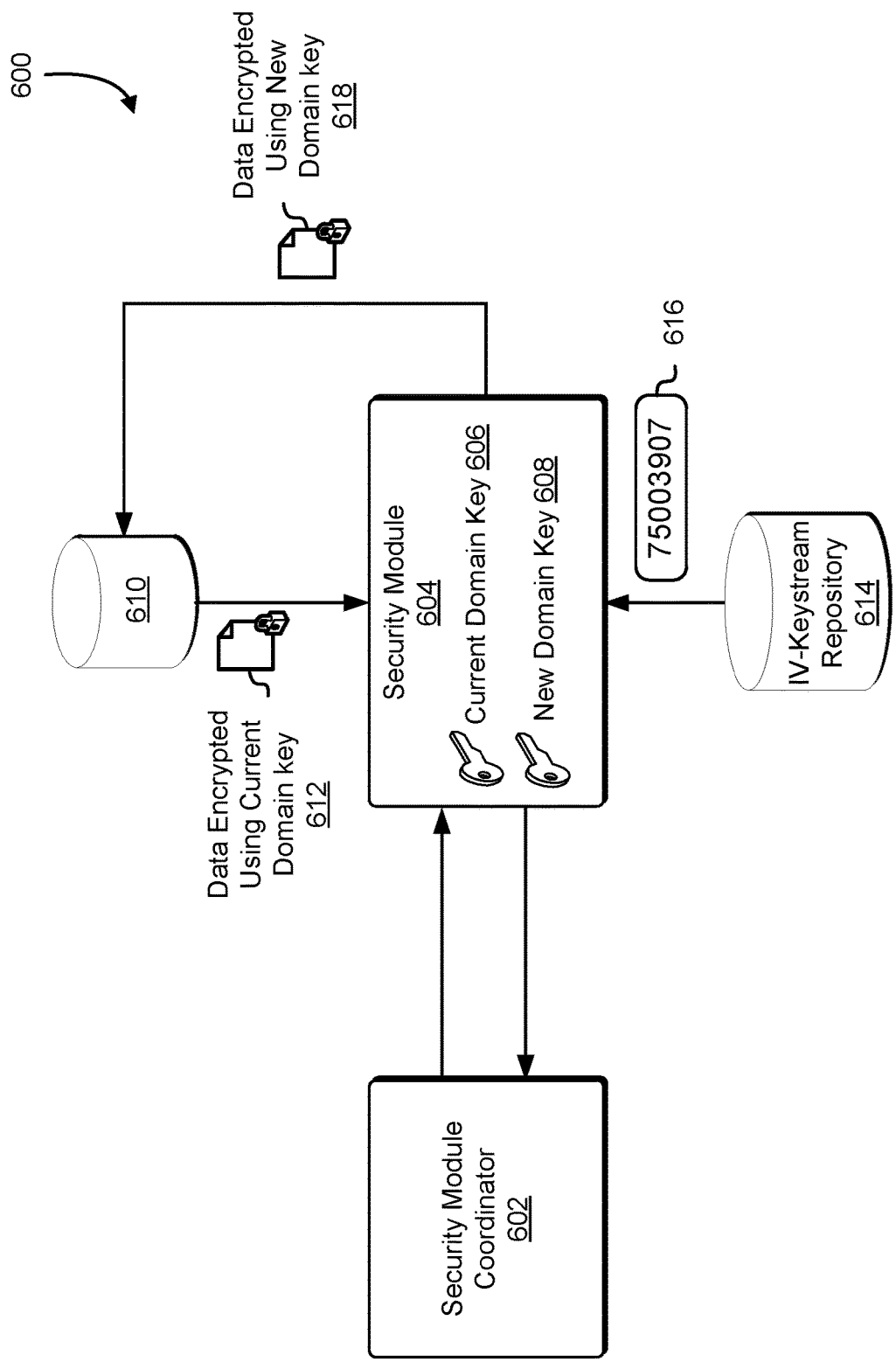
FIG. 6 illustrates an environment in which various embodiments can be implemented.

FIG. 6 shows an illustrative example of a diagram 600 illustrating various aspects of the present disclosure. FIG. 6 shows an environment configured to rotate domain keys using a keystream repository. In an embodiment, the security coordinator 602 is implemented in accordance with the security coordinator described in FIG. 2 and is further configured to issue a command to a security module 604 to rotate domain keys. In some embodiments, the security module coordinator is configured to obtain a quorum-authorized command for rotating domain keys in the same manner that a quorum-authorized command to generate a domain key is obtained in FIG. 2.

In some embodiments, the security module coordinator 604 is implemented in accordance with the security module coordinator described in FIG. 2 and is further configured to have access to a current domain key 606, a new domain key 608, and access to a store of customer keys 610. For clarity, one security module 604 is shown, but in some embodiment, there may be a set of security modules 604.

The current domain key 606 may be a domain key that has been used by the security module to encrypt customer keys stored in a repository (such as the store of customer keys 610). In some embodiments, the current domain key is a cryptographic key that has been distributed amongst a set of security modules and has been designated as a domain key usable in performing cryptographic operations on customer keys.

The new domain key 608 may be a domain key that may have been generated in the process described in FIG. 3, and may have been received 402 by the security module during the distributing of domain keys as described in FIG. 4. In some embodiments, the security module retains both the current domain key and the new domain key as the new domain key may not be used in cryptographic operations on customer keys until after domain keys are rotated. In some embodiments, the security module 604 stores the new domain key internally (that is, securely within the security module) in plaintext, or in ciphertext. In some embodiments, the security module stores the new domain key externally (that is, outside the security module without assurances of security) in an encrypted format.

The stored customer keys 610 may be stored in any suitable manner, including as a file or files, a database record or database records, and so on. In some embodiments, the stored customer keys 610 are stored on a network drive that is accessibly by the security module 604. In some embodiments, the stored customer keys 610 are stored such that they are accessibly by a set of security modules (not shown in FIG. 6), but in other embodiments, the stored customer keys 610 are stored such that they are only accessibly by a single security module or a proper subset of the security modules. In some embodiments, the stored customer keys 610 are stored in a component located within the security module. The stored customer keys 610 may be accessible to the security module via a web service request.

In some embodiments, stored customer keys 610 are made available to and/or accessible by the security module 604. The security module may receive in response to a request, a customer key encrypted under the current domain key 612. In some embodiments, a batch of encrypted customer keys (i.e., one or more encrypted customer keys) is provided in response to a request. In some embodiments, the encrypted customer key (or keys) may be decrypted using the current domain key 606. In some embodiments (e.g., embodiments where the stored customer keys 610 are stored in a component located within the security module) the customer key may be un-encrypted. In an embodiment, the store 610 contains encrypted customer keys that are managed on behalf of multiple (i.e., more than one) customer.

In some embodiments, the store 610 may contain generic data objects not limited to customer keys, and further, the data objects may be encrypted. In some embodiments, the security module may receive, in response to a request, a plurality of (encrypted or un-encrypted) data objects of the store 610 of data objects rather than a customer key encrypted under the current domain key 612. A plurality of encrypted data objects may, for example, refer to a plurality of encrypted data objects (e.g., N encrypted data objects aggregated together into a data object that is encrypted), a plurality of data objects wherein the plurality is encrypted (e.g., an encrypted aggregation of N data objects), a single encrypted data object, and so on.

The keystream repository 614 may be implemented in accordance with the keystream repository described in FIG. 2 and, in some embodiments, may make available to the security module 604 keystreams 616 and/or the corresponding initialization vectors.

Figure 7:
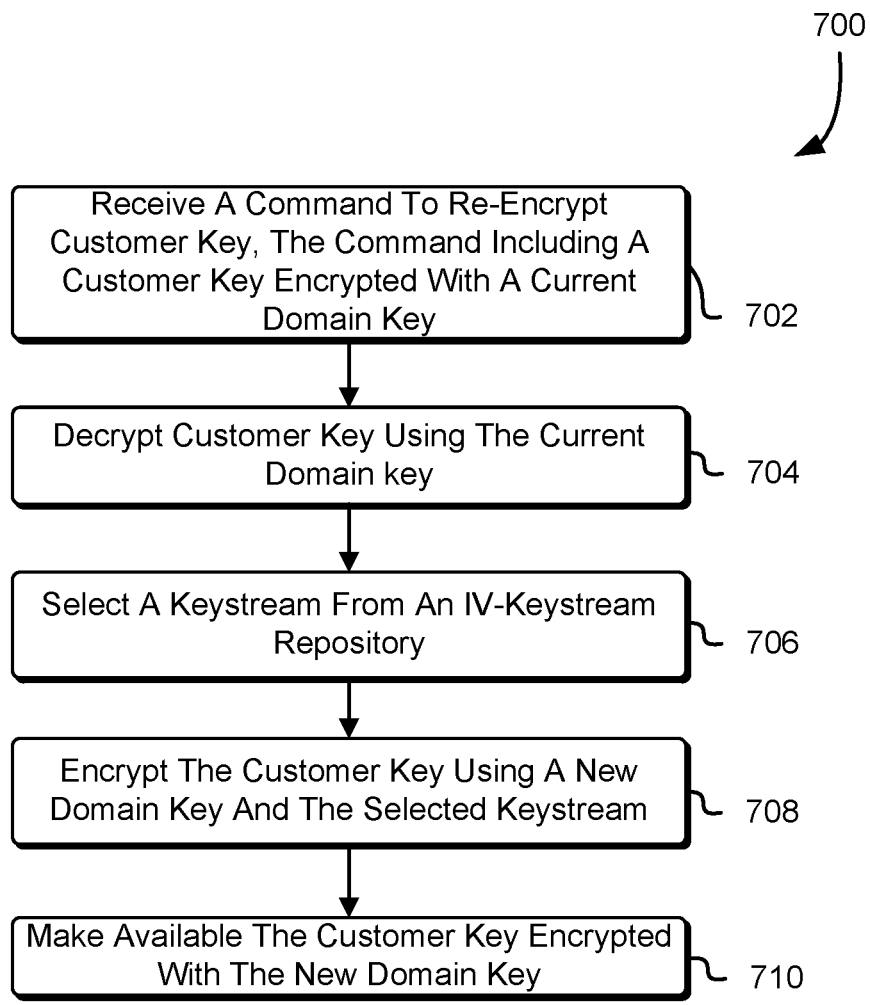
FIG. 7 is an illustrative process for reencrypting encrypted customer key under a domain key using an IV-keystream repository.

The customer key encrypted under the new domain key 618 may be generated in response to a trigger to reencrypt customer master keys as described in FIG. 7. The customer key generated under the new domain key 618 may be encrypted using at least the new domain key 608 and a keystream 616 and in some embodiments may also use an initialization vector corresponding to the keystream 616, additional authenticated data, or any combination thereof. In some embodiments, new domain key is encrypted using the authenticated encryption function specified in the NIST SP800-38D publication, which is incorporated herein by reference.

FIG. 7 describes an illustrative process 700 for reencrypting customer keys using a keystream repository. The process 700 may be performed by a security module described above in FIG. 6 or any other suitable component or components. In an embodiment, the security modules receives 702 a command to reencrypt the customer key, the command including at least a customer key encrypted under the current domain key. The command may be a quorum-authorized command and/or may be issued as part of a domain key rotation.

Upon receiving the customer key encrypted under the current domain key, the security module may decrypt 704 the customer key using the current domain key. In some embodiments, the encrypted customer key includes additional authenticated data and/or an authentication tag.

In some embodiments, the authentication tag is used to perform an authentication check. The check may be done without decrypting the encrypted data key. For example, in an embodiment, the security module uses the initialization vector and ciphertext to compute an authentication tag using, for example, a cryptographic hash algorithm or another suitable authentication tag algorithm. The check may then verify the computed authentication tag matches the provided authentication tag. If the value of the computed authentication tag and provided authentication tag do not match, the check will fail, and the client may be notified of the failure, for example, through returning a failure code to via API or some other indication of inauthenticity. In other embodiments, the encrypted data key is decrypted as part of the check.

In some embodiments, the security module selects 706 a keystream and corresponding initialization vector from an IV-keystream repository. The selecting of the keystream and corresponding initialization vector may be based at least in part on several considerations including the size of the keystream—in some embodiments, the security module may select the first keystream that is at least large enough for encrypting the plaintext customer key, but in other embodiments, the security module may select the smallest keystream that is sufficient for encrypting the plaintext customer key. In some embodiments, the selection of the keystream is done exclusively by the IV-keystream repository (e.g., the security module requests a keystream and initialization vector and the IV-keystream repository performs all the sufficiency checks described above), but in other embodiments, the security module performs at least part of the selection (e.g., the security module iteratively retrieves keystreams and corresponding initialization vectors from the IV-keystream repository and the security module performs the sufficiency checks until the checks are satisfied).

In some embodiments, the keystream and corresponding initialization vector are removed from the IV-keystream repository, but in other embodiments, they are instead marked as having been used (e.g., by setting a Boolean TRUE/FALSE flag associated with the selected keystream) so that the same keystream and initialization vector are not re-used in subsequent encryptions. In some embodiments, there is additional information recorded regarding the size and number of keystreams and initialization vectors. This information may be used in the determining of the keystream and IV-keystream repository sizes 510-512.

The encrypting 708 of the plaintext customer key may be performed using the new domain key 608, the selected keystream 616 and corresponding initialization vector. In some embodiments, additional authenticated data is also used as an input to the encryption operation. In some embodiments, an authenticated encryption function is used to generate an encrypted customer key and an authentication tag. In some embodiments, the encryption is performed in accordance with the authenticated encryption function described in the NIST SP800-38D publication, which is incorporated herein by reference.

After encrypting the customer key, the customer key encrypted under the new domain key may be made available 710, for example, by storing it in the store of customer keys 610. In some embodiments, the customer key encrypted under the new domain key 618 replaces the customer key encrypted under the current domain key 612, but in other embodiments, customer key encrypted under the current domain key 612 may be retained. For example, an embodiment may store the customer key encrypted under the new domain key in a staging area (e.g., a shadow table) until all customer keys in the store 610 are encrypted under the new domain key 608 and then apply the changes in bulk (e.g., by swapping the shadow table with the primary table).

Figure 8:
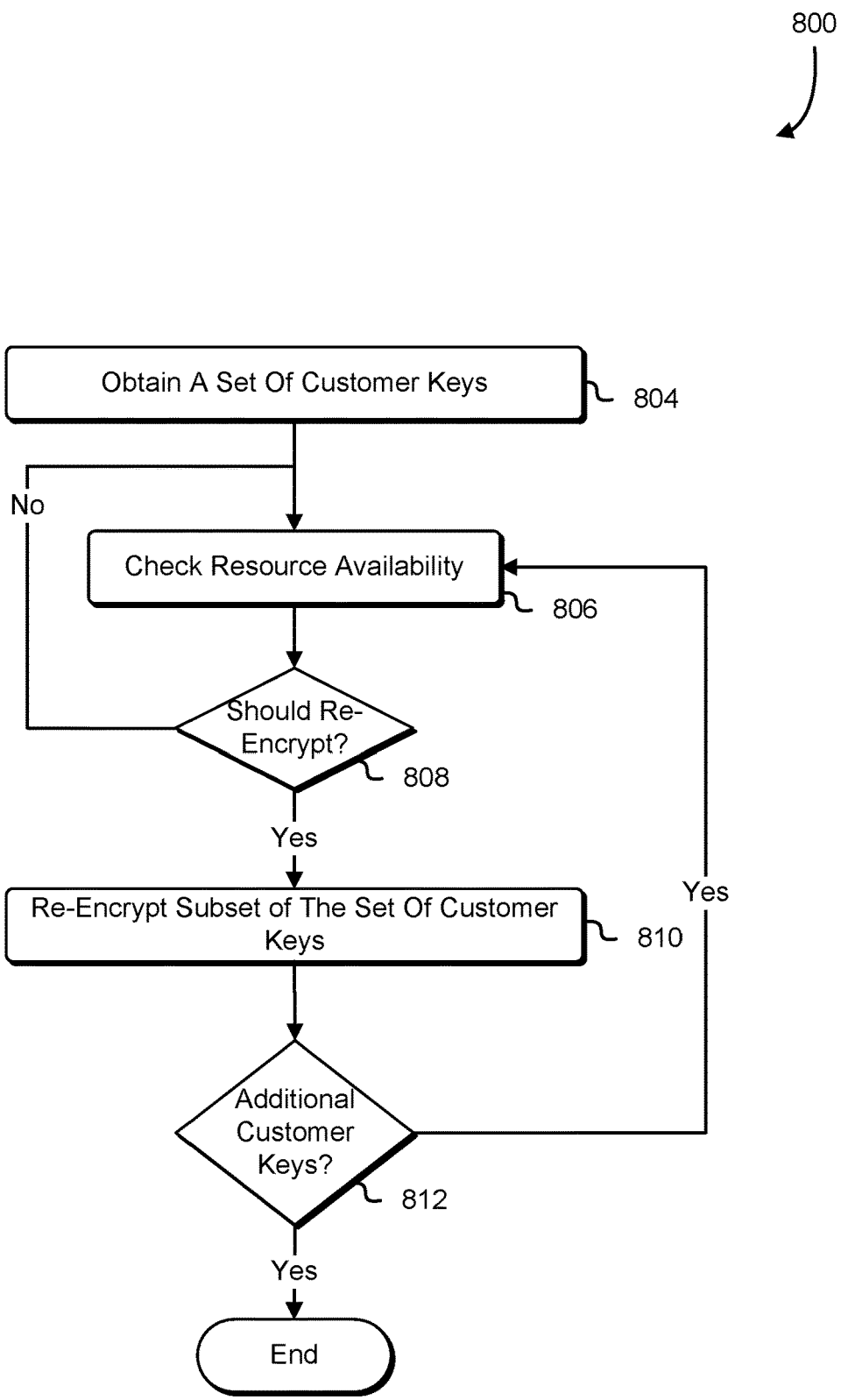
FIG. 8 is an illustrative process for reencrypting customer keys.

FIG. 8 describes an illustrative process 800 for rotating domain keys. The process 800 may be performed by any suitable system. In this example, the process 800 is performed by a security module, such as described above. In an embodiment, the security module obtains 804 a set of customer keys. The customer keys may be obtained, for example, from a store of customer keys as described in FIG. 6. In some embodiments, the security module issues a single request to obtain a set of customer keys, but in other embodiments the security module may issue multiple requests to obtain a set of customer keys (e.g., one request per customer key). In an embodiment, the security module requests batches of customer keys and perform domain key rotations for a batch of customer keys at a time. The customer keys in the set of customer keys may be selected based on the availability of the customer keys, including, for example, whether the customer key is in use (excluding that customer key from being selected). In some embodiments, customer keys are stored in multiple physical drives, some of which are mounted (i.e., available for access) whereas some physical drives may not be mounted (e.g., due to inactivity). In such an embodiment, customer keys from physical drives that are mounted may be selected before customer keys from unmounted physical drives.

In some embodiments, the security module checks 806 or monitors the availability of resources. Resources that may be checked or monitored include the availability of resources, including the availability of computing resources usable to perform cryptography operations, the availability of the IV-keystream repository, and so forth. Availability may refer to the amount of a particular resource available (e.g., the number of threads or percentage of CPU resources available) or the accessibility of a particular resource (e.g., whether particular a SAN or network drive or other data storage service can be reached via a web service request). A queue of pending requests may also be checked to gauge resource availability such that, if the queue is empty, there may be resource availability.

In some embodiments, the security module determines whether to rotate domain keys 808 with respect to the obtained 804 customer keys. In other words, the security module determines 804 whether to reencrypt customer keys from the previous domain key to the next (e.g., current) domain key. The availability of resources may be used at least in part to determine whether the domain keys should be rotated. For example, some security modules may rotate domain keys while they are idle (i.e., not handling customer requests). In other embodiments, domain key rotation may "piggyback" off of another request that mounts the storage medium where customer keys are stored. In some embodiments, domain keys are rotated as background tasks that may be pre-empted by higher priority tasks such as user-initiated tasks. Tasks may be, for instance, placed in a priority queue where tasks related to pending requests may move ahead in priority relative to tasks related to reencryption of customer keys. If it is determined that a rotation should not occur, the security module may continue to monitor available resources to determine when a rotation should occur. In some embodiments, the reencryption may be delayed, re-scheduled, or canceled completely.

If it is determined that a reencryption should occur, a security module may perform reencryption 810 of a subset of the set of customer keys, for example, in accordance with the process described in FIG. 7. The subset may be the whole set or a proper subset thereof. In some examples, the subset contains a single customer key, although a batch of multiple keys may comprise the subset. In some embodiments, customer keys are reencrypted using the process in FIG. 7 one by one sequentially.

Having reencrypted the subset of customer keys, the security module may determine 812 whether there are additional customer keys to re-encrypt. If determined 812 that there are additional customer keys to encrypt, the security module may monitor for resource availability and perform additional reencryption operations as resources are available, such as described above, until determined 812 that there are no additional keys to rotate, at which point the process 800 may end. In alternate embodiments, the security module may make a query over a network to determine whether there are additional sets of customer keys to be re-encrypted to the new domain key and, if there are, may perform the process 800 an additional time. Other variations are also considered as being within the scope of the present disclosure.

Figure 9:
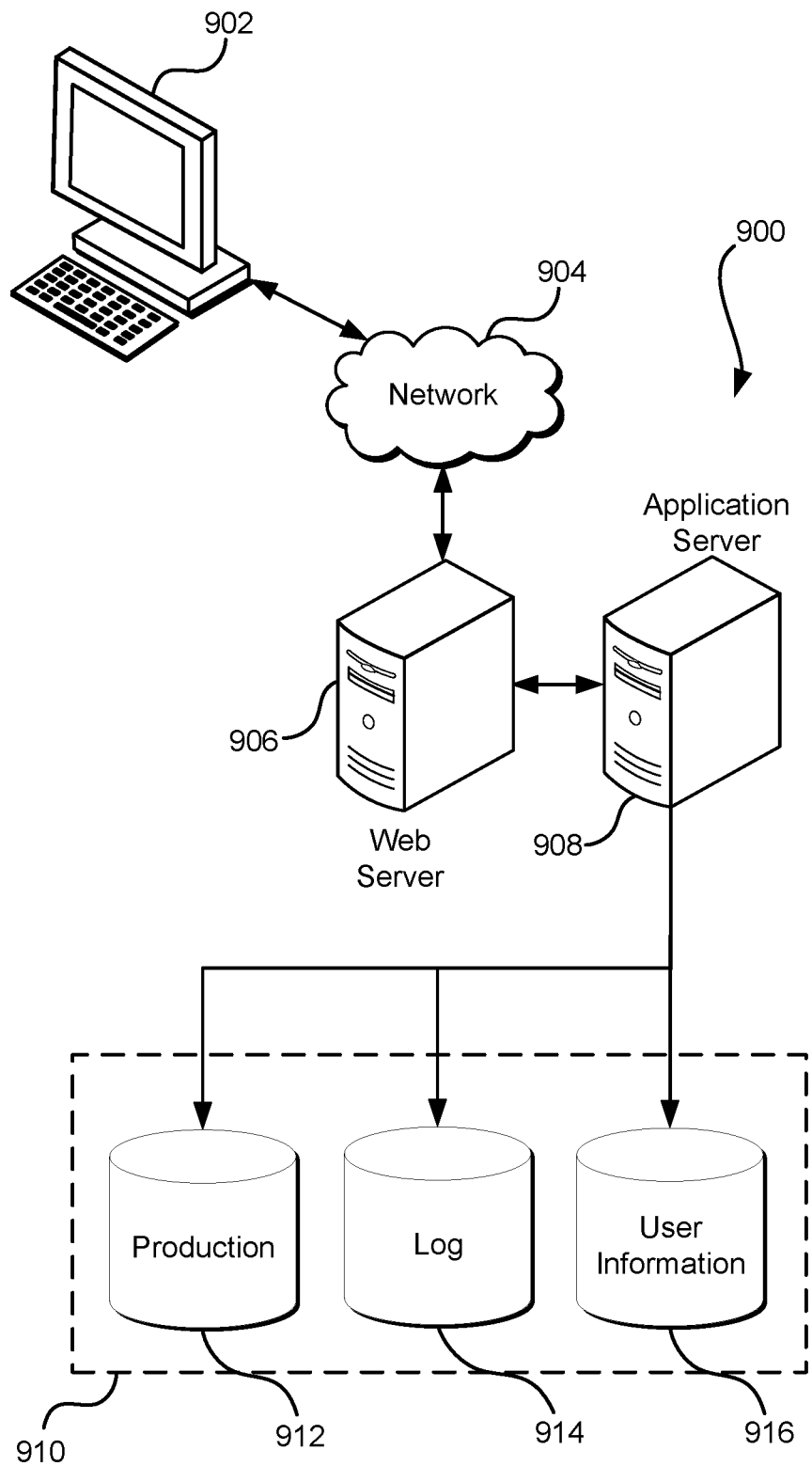
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase ®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B, and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system comprising memory to store instructions that, as a result of execution by one or more processors, cause the system to:
   provide a key to a plurality of devices;
   cause the plurality of devices to collectively generate a set of keystreams using the key and a plurality of initialization vectors, a first portion of the plurality of initialization vectors being reserved for use by a first device of the plurality of devices and a second portion of the plurality of initialization vectors being reserved for use by a second device of the plurality of devices;
   identify a keystream of the set of keystreams that is unused for performance of cryptographic operations; and
   cause the keystream to be used to perform a cryptographic operation.

2. The system of claim 1, wherein the instructions that, as result of execution, cause the system to cause the keystream to be used to perform the cryptographic operation cause the system to perform the cryptographic operation in response to a request submitted to the system.

3. The system of claim 1, the set of keystreams is generated using a block cipher mode of operation.

4. The system of claim 3, wherein block cipher mode of operation is Advanced Encryption Standard Counter with CBC-MAC (AES-CCM).

5. A computer-implemented method, comprising:
   providing a key to a plurality of devices;
   causing the plurality of devices to collectively generate a set of keystreams using the key and a plurality of initialization vectors, a first portion of the plurality of initialization vectors being reserved for use by a first device of the plurality of devices and a second portion of the plurality of initialization vectors being reserved for use by a second device of the plurality of devices;
   identifying a keystream of the set of keystreams that is unused for performance of cryptographic operations; and
   causing the keystream to be used to perform a cryptographic operation.

6. The computer-implemented method of claim 5, wherein causing the keystream to be used to perform the cryptographic operation comprises performing the cryptographic operation on a cryptographic key of a set of cryptographic keys that is managed by a key management service.

7. The computer-implemented method of claim 5, wherein causing the keystream to be used to perform the cryptographic operation comprises encrypting a data object to produce an encrypted data object.

8. The computer-implemented method of claim 7, further comprising obtaining the data object using a second key, wherein the second key is different from the key.

9. The computer-implemented method of claim 5, wherein each device of the plurality of devices is a security module.

10. The computer-implemented method of claim 5, wherein causing the plurality of devices to collectively generate the set of keystreams includes causing each device of the plurality of devices to generate a set of initialization vectors unused by any other device in the plurality of devices for generating keystreams.

11. The computer-implemented method of claim 10, wherein:
    causing the keystream to be used to perform the cryptographic operation results in a set of encrypted data objects; and
    the method further comprises causing the set of encrypted data objects to be stored outside of the device.

12. The computer-implemented method of claim 10, wherein the key is programmatically unexportable from each device of the plurality of devices.

13. A non-transitory computer-readable storage medium comprising executable instructions that, if executed by one or more processors of a computer system, cause the computer system to at least:
    provide a key to a plurality of devices;
    cause the plurality of devices to collectively generate a set of keystreams using the key and a plurality of initialization vectors, a first portion of the plurality of initialization vectors being reserved for use by a first device of the plurality of devices and a second portion of the plurality of initialization vectors being reserved for use by a second device of the plurality of devices; and cause a keystream of the set of keystreams that is unused for performance of cryptographic operations to be used to perform a cryptographic operation.

14. The non-transitory computer-readable storage medium of claim 13, wherein the cryptographic operation utilizes a stream cipher.

15. The non-transitory computer-readable storage medium of claim 14, wherein the stream cipher uses authenticated encryption.

16. The non-transitory computer-readable storage medium of claim 13, wherein the instructions that cause the plurality of devices to collectively generate the set of keystreams, if executed, cause the computer system to generate the set of keystreams using information specific to the plurality of devices.

17. The non-transitory computer-readable storage medium of claim 16, wherein the initialization vectors are determinable using the information specific to the plurality of devices.

18. The non-transitory computer-readable storage medium of claim 13, wherein the instructions to cause the keystream to be used to perform the cryptographic operation include instructions to:

make available, to a device of the plurality of devices a first encrypted data object, wherein the first encrypted data object is encrypted using a second key accessible to the plurality of devices; and obtain a second encrypted data object, wherein the second encrypted data object is encrypted using the key and the keystream.

19. The non-transitory computer-readable storage medium of claim 18, wherein the data object is a cryptographic key.

20. The non-transitory computer-readable storage medium of claim 13, further comprising instructions that, if executed by the one or more processors, cause the computer system to store an indication that the keystream was used for the performance of the cryptographic operation.

\* \* \* \* \*